United States Patent
Nakamura et al.

(10) Patent No.: US 7,429,138 B2
(45) Date of Patent: Sep. 30, 2008

(54) OPTICAL CONNECTION METHOD AND OPTICAL TRANSMISSION APPARATUS

(75) Inventors: Yoshisada Nakamura, Shizuoka (JP); Hiroki Takahashi, Shizuoka (JP); Takanori Sato, Shizuoka (JP); Kenji Matsumoto, Kanagawa (JP); Hiroyuki Hiiro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/660,648

(22) PCT Filed: Aug. 19, 2005

(86) PCT No.: PCT/JP2005/015490
§ 371 (c)(1),
(2), (4) Date: Feb. 21, 2007

(87) PCT Pub. No.: WO2006/022357
PCT Pub. Date: Mar. 2, 2006

(65) Prior Publication Data
US 2007/0286560 A1    Dec. 13, 2007

(30) Foreign Application Priority Data
Aug. 23, 2004  (JP) .............................. 2004-242923

(51) Int. Cl.
*G02B 6/36* (2006.01)
(52) U.S. Cl. .............................. 385/88; 385/37; 385/39; 385/53; 385/92; 385/123; 385/124; 385/125; 385/126; 385/127; 385/128; 385/141; 385/142; 385/144; 385/147
(58) Field of Classification Search .................. 385/37, 385/39, 88, 123–128, 141–145, 147
See application file for complete search history.

(56) References Cited

U.S. PATENT DOCUMENTS
5,732,176 A * 3/1998 Savage, Jr. ............ 385/92
(Continued)

FOREIGN PATENT DOCUMENTS
JP    11-305066 A    11/1999
(Continued)

OTHER PUBLICATIONS

Giok-djan Khoe ("Lightwave Technology: Expectations, Problem, and Achievements" IEEE Transactions on Selected Topic In Quantum Electronics, vol. 6, No. 6, Nov./Dec. 2000).*

(Continued)

*Primary Examiner*—Brian Healy
*Assistant Examiner*—Hung Lam
(74) *Attorney, Agent, or Firm*—Sughrue Mion, PLLC (57) ABSTRACT

A plastic optical fiber (11) has a core (12) and a clad (13). The clad (13) is composed of an outer clad (14) and an inner clad (15). The refractive index in the core (12) gradually increases as the distance from the center thereof decreases. The refractive index in the inner clad (15) is equal to the minimum value of the refractive index in the core (12), and the refractive index in the outer clad (14) is smaller than that in the inner clad (15). For the purpose of decreasing the transmission loss between the plastic optical fiber (11) and a light emission device or the light receiving device, the diameter d1 of the core (12) and the outer diameter d2 of the inner clad (15) satisfy the following conditions;

$100(\mu m) \leq d1 \leq 700(\mu m)$ $200(\mu m) \leq d1 \leq 1000(\mu m)$ $d1 < d2$.

19 Claims, 4 Drawing Sheets

U.S. PATENT DOCUMENTS

2003/0016920 A1* 1/2003 Sohmura et al. ............... 385/88
2005/0207714 A1* 9/2005 Koike et al. .................. 385/124

FOREIGN PATENT DOCUMENTS

| JP | 2002-311260 A | 10/2002 |
| JP | 2002-350654 A | 12/2002 |
| JP | 2003-174419 A | 6/2003 |
| WO | WO 02/01261 A1 | 1/2002 |

OTHER PUBLICATIONS

"Usage of Plastic Fiber and Important Notices" Optronics Co., Ltd., 1992, pp. 87-98, (concreteley, 90-92).

* cited by examiner

OPTICAL CONNECTION METHOD AND OPTICAL TRANSMISSION APPARATUS

TECHNICAL FIELD

The present invention relates to an optical connection method and an optical transmission apparatus to transmit optical signals through transmission medium such as a plastic optical fiber.

BACKGROUND ART

A plastic optical fiber is composed of a core as a light passage and a clad to cover the core. The clad has a smaller refractive index than the core. In general, there are a glass optical fiber and a plastic optical fiber (POF). The core of the glass optical fiber is composed of quartz or glass. Examples of the glass optical fiber are an entire quartz optical fiber in which the core and the clad are made of quartz, a polymer clad optical fiber in which the core is made of quartz and the clad is made of silicone or polymer fluoride, and a multi-component optical fiber having the glass core and the glass clad. On the other hand, the core and the clad of the POF are composed of plastic material.

For the purpose of decreasing the transmission loss of the quartz optical fiber and the POF, various kinds of structures of the optical fiber are proposed. For example, the clad has two layers (core and clad) in which the refractive index in the core gradually changes as the distance from the center of the core, and the refractive indices in the core and the clad, and the diameter of the clad are adjusted to decrease the transmission loss. In addition, "Usage of Plastic Fiber and Important Notices", (issued from Optronics Co., Ltd., 1992), in page 87, describes an optical fiber in which the refractive indices in the clad and the core, and the diameter of the core satisfy a certain condition.

Compared with the quartz, the plastic material as the optical transmission medium has advantages in formability, weight, low manufacture cost, bending property, resistance to shock, and so forth. Because of the larger transmission loss than the glass optical fiber, the plastic optical fiber is not suitable in transmitting optical signals for a long distance. The plastic optical fiber, however, enables a large diameter of the core part (several micrometers or larger, for example). Thus, with the plastic optical fiber, it is not necessary to connect the plastic optical fiber to an optical device for dividing or connecting the optical fibers with high precision. Therefore, the plastic optical fiber has merits, such as facility in connection, facility in fiber terminal process, non-necessity for core alignment with high precision. Moreover, the plastic optical fiber has various merits such as low danger to prick into human body, easy construction, high resistance to vibration and low price. Accordingly, it is planned to utilize the plastic optical fiber not only as household and automobile purposes but as a short-distance, high-capacity cable such as inner wirings for high-speed data processing device and a digital video interface (DVI) link.

The POF for public purpose is fixed to an attachable connector, so the plastic optical fiber for such purpose has a large diameter for the purpose of increasing the permissive range to position deviation in connection. The plastic optical fiber with a large diameter can increase the permissive range in connection with a light source (light emission element, light emission device) with a large numerical aperture. But the angle of emergence of the signal light from the fiber edge increases as well. Reducing the gap from the optical fiber edge to the light receiving element (light receiving device) for the purpose of reducing the angle of emergence requires high alignment precision, so reducing the gap will lose the advantage of the POF in terms of facility in connection. In order to deal with such problem, Japanese Patent Laid-Open Publication (JP-A) Nos. 2002-311260 and 2002-350654, and the above mentioned reference ("Usage of Plastic Fiber and Important Notices") discloses the solutions to locate a light-focusing element between the optical fiber edge and the light receiving element, and to increase the size of the light receiving element.

The light-focusing element disclosed in the above references, however, causes Fresnel loss at the interface of the optical elements and increase in manufacture cost due to increase in optical parts. Moreover, increasing the size of the light receiving element increases the manufacture cost and decreases the sensitivity due to increase in the dark current. Thus, it is desired to realize optical transmission at a low cost without losing the advantages of the optical fiber with a large diameter.

An object of the present invention is to provide an optical connection method and an optical transmission apparatus to realize excellent connection between a plastic optical fiber having a large diameter and a light receiving element, and thus possible to improve the transmittance from the light emission element and the light receiving element through the plastic optical fiber.

DISCLOSURE OF INVENTION

In order to achieve the above objects, a light emission device and a light receiving device are connected via a graded index plastic optical fiber. The light beam from a light emission device enters one end of a graded index type plastic optical fiber, is outputted from the other end of the plastic optical fiber and enters the light receiving device. The plastic optical fiber comprises a core, a first clad and a second clad. The core is in the shape of an approximately circular cross section and has the refractive index profile in which the refractive index increases toward the center. The first clad is formed outside of the core and has a refractive index equal to or smaller than the core. The second clad is formed outside of the first clad and has a refractive index smaller than the first clad.

The plastic optical fiber satisfying the following conditions;

$$100(\mu m) \leq d1 \leq 700(\mu m)$$

$$200(\mu m) \leq d2 \leq 1000(\mu m)$$

$$d1 < d2$$

wherein d1 indicates the diameter of the core, and d2 indicate the outer diameter of the first clad.

In a preferable embodiment, the numerical aperture of the light emission device is 0.05 to 0.35. The core and the first clad satisfy the conditions of;

$$0.5 \times d2 \leq d1$$

$$300(\mu m) \leq d1 \leq 700(\mu m)$$

$$350(\mu m) \leq d2 \leq 1000(\mu m)$$

The outer diameter of the first clad is preferably equal to or larger than the diameter of the light beam to enter the plastic optical fiber. The numerical aperture of the light emission device is preferably smaller than the numerical aperture of the core. The plastic optical fiber and the light receiving device are connected without a light focusing element, and the gap between the plastic optical fiber and the light receiving device is 1 µm to 1000 µm.

The light emission device preferably has a light resonator.

According to the present invention, since the light emission element and the light receiving element are connected via a plastic optical fiber with a large diameter, it is possible to improve the transmittance from the light emission element and the light receiving element.

BEST MODE FOR CARRYING OUT THE INVENTION

The preferable embodiments of the present invention are described with reference to the drawing, but these embodiments do not limit the scope of the present invention. Initially, the structure and the characteristics of the manufactured plastic optical fiber are described. Then, the method to draw a preform to manufacture the plastic optical fiber is described.

Figure 1:
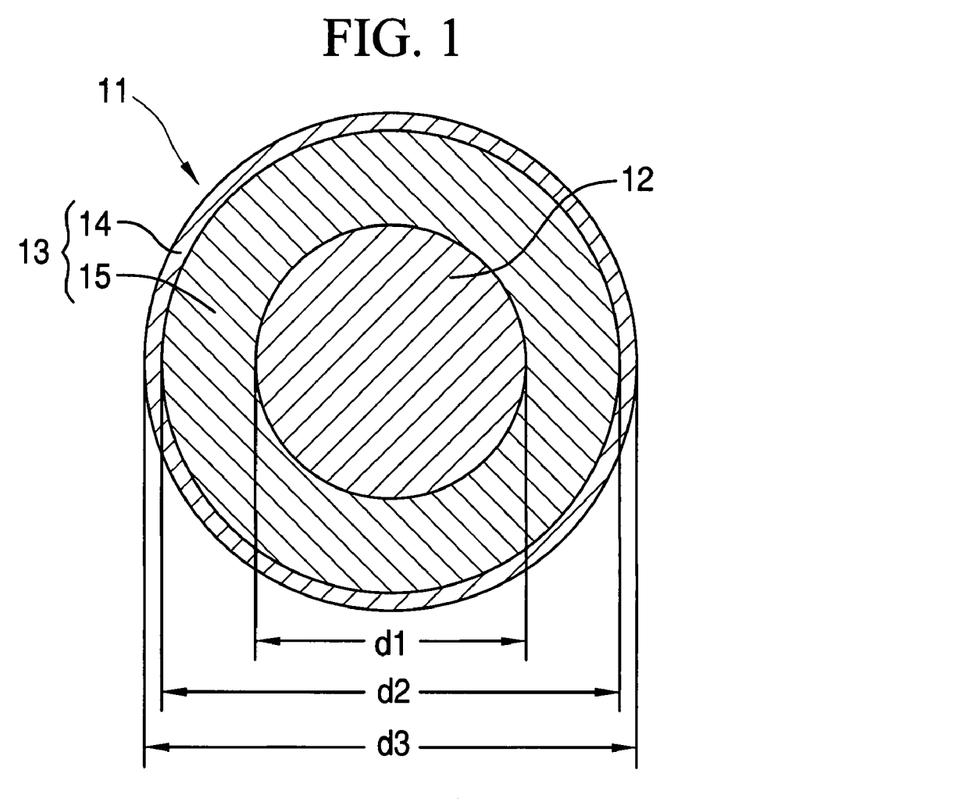
FIG. 1 is a cross section of a plastic optical fiber.

Referring to FIG. 1, the POF (plastic optical fiber) 11 is composed of a core 12 as the light passage and a clad 13 as the sheath of the POF. The clad 13 has an inner clad 15 and an outer clad 14. The inner clad 15 comes in contact with the inner wall of the outer clad 14, and the core 12 is located inside the inner clad 15. As shown in FIG. 1, d1 (µm), d2 (µm) and d3 (µm) indicates the diameter of the core 12, the outer diameter of the inner clad 15, and the outer diameter of the outer clad 14, respectively. The outer diameter d2 is equal to the inner diameter of the outer clad 14, and the diameter d1 of the core 12 is the same as the inner diameter of the inner clad 15.

The outer clad 14 has a tubular shape with uniform thickness, and the outer diameter d3 and the inner diameter thereof are also uniform in the longitudinal direction. The outer clad 14 is formed from polyvinylidene fluoride (PVDF), for example, by melt-extrusion. The outer clad 14 may be formed from other materials, such as polymethylmethacrylate (PMMA), which will be explained later. The inner clad 15 is in the tubular shape in which the outer diameter d2 and the inner diameter are uniform in the longitudinal direction. The inner clad 15 is formed from polymer like PMMA. The outer clad 14 and the inner clad 15 may be simultaneously formed by melt-extrusion. The outer clad 14 and the inner clad 15 may be successively formed by melt-extrusion of the outer clad 14, pouring polymerizable compound like methylmethacrylate (MMA) in the outer clad 14, rotating the outer clad 14 and polymerizing the compound to form the inner clad 15 inside the outer clad 14.

Figure 2:
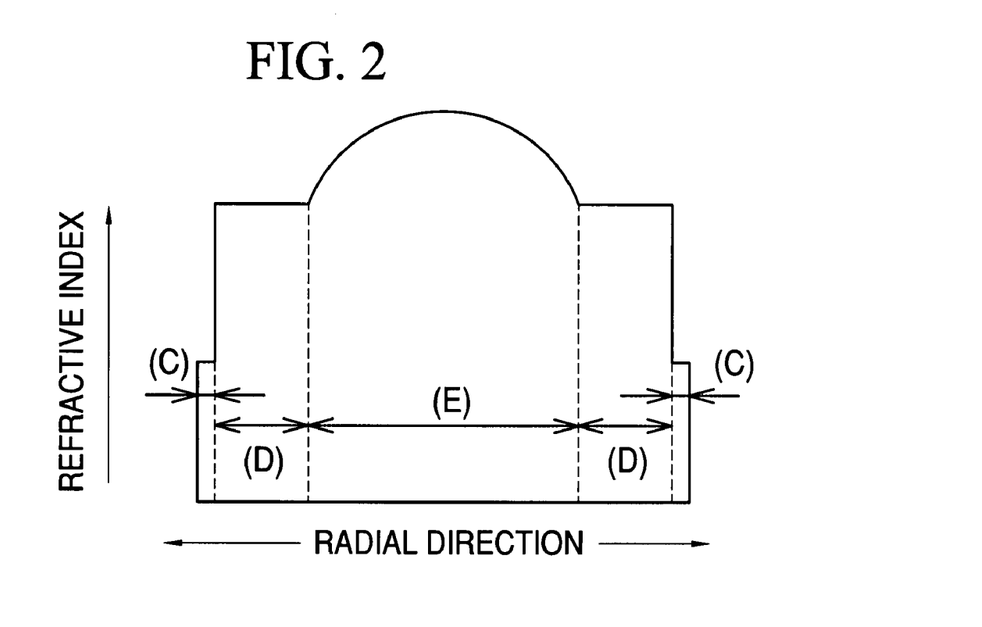
FIG. 2 is a graph of the refractive index profile in the radial direction of the plastic optical fiber.

In FIG. 2, the refractive index profile of the POF is shown. In FIG. 2, the horizontal axis indicates the distance from the center of the POF in the radial direction, and the vertical axis indicates the refractive index. The graph goes upward as the refractive index increases. The area (C) in FIG. 2 stands for the refractive index in the outer clad 14, the area (D) is the refractive index in the inner clad 15, and the area (E) is the refractive index in the core 12.

As shown in FIG. 2, the refractive index in the core 12 gradually increases from the outer side toward the center. The refractive index in the outer clad 14 is smaller than that in the inner clad 15, and the refractive index in the inner clad 15 is equal to or smaller than that in the core 12. The minimum value of the refractive index in the core 12 is the same as the refractive index in the inner clad 15, according to the present embodiment. In this embodiment, the core 12 is formed by interfacial gel polymerization method, which will be explained later, so that the refractive index gradually increases from the outer side to the center thereof. As for the refractive index in the core 12 in the radial direction, the maximum value is preferably larger by 0.001 to 0.3 than the minimum value. Thereby, the POF 11 functions as an optical transmission medium. Although it is preferable that the border between the inner clad 15 and the core 12 (shown in FIG. 1) is clear, the border is not necessarily identified in the POF 11.

Incident light to the POF 11 enters the edge of the core 12 and the inner clad 15 having the refractive index relationship shown in FIG. 2. Incident light to the inner clad 15 is partially propagated to the core 12 and transmitted through the core 12, and thus the most part of incident light is emerged from the edge of the core 12. Therefore, the refractive index profile shown in FIG. 2 makes it possible to increase the area of incident light and to reduce extension of output light from the POF 11.

Since the outer diameter d2 of the inner clad 15 is 200 µm to 1000 µm, the outer diameter d3 of the outer clad 14 becomes larger than 200 µm. Moreover, the diameter d1 of the core 12 (smaller than the outer diameter d2) is 100 µm to 700 µm. In the event of LED as the light emission element and PD (photo diode) as the light receiving element, it is possible to reduce transmission loss in both of the light emission and light reception sides of the POF, and to reduce transmission loss at the positions to connect the POF and these optical elements.

If the outer diameter d2 of the inner clad 15 is smaller than 200 µm, the core 12 can not receive sufficient amount of incident light from the LED as the light emission element due to the small light reception area (the core 12). On the other hand, when the outer diameter d2 is larger than 1000 µm, the core 12 becomes too large, compared with the size necessary for receiving incident light. The core 12 having the diameter d1 of smaller than 100 µm reduces allowance to deviation in the light axis of output light. Even if the diameter d1 is smaller than the diameter d2 of the inner clad, the diameter d1 of larger than 700 µm decreases coupling efficiency of the POF and the light receiving element. The area of the output light after convergence in the GI POF takes a certain value at a convergence length (about 20-30 m) from the entrance of the POF, so the diameter d1, d2 within the above described range is preferable if the length of the POF is larger than the convergence length.

The diameter d1 of the core 12 is more preferably 300 µm to 700 µm, and most preferably 450 µm to 500 µm. The outer diameter d2 of the inner clad 15 is more preferably 350 µm to 1000 µm, and most preferably 700 µm to 750 µm. The diameter d1 of the core 12 is preferably larger than the half of the outer diameter d2 of the inner clad 15.

In FIG. 2, the inner clad 15 has approximately the same refractive index over the radial direction, but the refractive index in the inner clad may increase step by step or gradually from the outer clad side to the core side. The difference between the maximum value and the minimum value of the refractive index in the inner clad is preferably as small as possible.

When the border between the core 12 and the inner clad 15 is not clear, the diameter d1, d2 are defined as follows. Because of the relationship between the refractive indices in the core 12 and inner clad 15, light intensity of the output light from the core 12 becomes different from that from the inner clad 15. Thus, the graph of light intensity in relation to the radial direction of the POF takes rapid increase or decrease. Such positions to show rapid increase or decrease are considered as the border between the inner clad 15 and the core 12. The length of these positions to show rapid increase and decrease is the diameter d1 of the core 12, and the outer diameter d2 of the inner clad 15 is the length from the position of the border obtained by the above method to the position in which the light intensity is zero.

The present invention is also applicable to the core having more than one layer. In order to obtain the similar optical property, it is possible to apply a pseudo graded index POF (so-called the multi step POF) in which the refractive index in the core changes step by step. But compared with the graded index POF (in which the refractive index gradually changes), the multi step POF is less effective in terms of transmittance. In the event of the core 12 having more than one layer, the edge of the core 12 is considered as the position in which the light intensity is 5 percent of the maximum light intensity, and the edge of the inner clad 15 is the position in which the light intensity is zero.

The preferable range of the core 12 and the inner clad 15 do not relate to the outer diameter d3 of the outer clad 14. For example, plural POF samples having different diameter d3 within the range from 500 µm to 1200 µm is formed, and the optical properties of these POF samples are measured. These POF samples can achieve the objects of the present invention. The results are partially described in the experiments which will be explained later. Although the clad 13 in this embodiment has two layers (outer clad 14 and inner clad 15), the clad 13 may comprise one layer or more than two layers.

Figure 3:
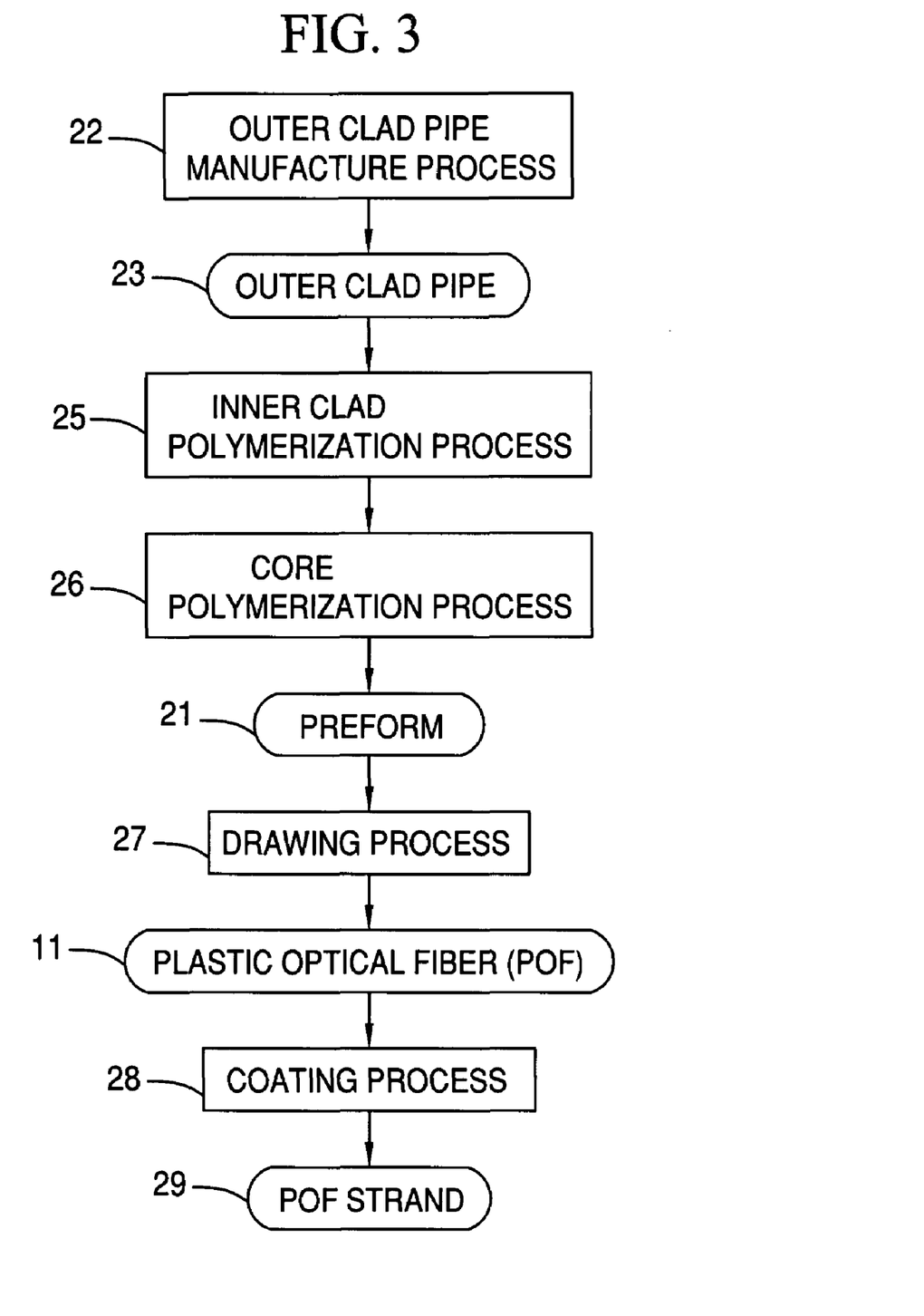
FIG. 3 is a flow chart of manufacture of the plastic optical fiber.

FIG. 3 shows the manufacture process of the POF and the optical fiber cable having the POF. The details of each manufacture process will be explained later. The POF 11 is formed by drawing a preform 21 in the longitudinal direction. The diameter of the POF 11 is smaller than that of the preform 21. The preform 21 has the outer clad, the inner clad and the core, so the basic structure of the preform 21 is the same as the POF 11 except for the diameter. The core and the clad of the preform 21 correspond to the core 12 and the clad 13 of the POF 11, respectively.

In the outer clad pipe manufacture process 22, the outer clad pipe 23 for the preform 21 is formed. The outer clad pipe 23 is the outer sheath of the preform 21 like the outer clad 14 of the POF 11 (see FIG. 1). Then, in the inner clad polymerization process 25, the inner clad is formed on the inner wall of the outer clad pipe 23 so that the cross section of the preform 21 has a hollow part in the center. The outer clad pipe 23 and the inner clad may be integrally formed by melt-extrusion. After the core polymerization process 26 to form the core in the hollow part of the preform 21, the preform 21 is obtained. The POF 11 is manufactured by drawing the preform 21 in the drawing process 27. The preform 21 itself exhibits the function as the light transmission medium. In the drawing process 27, tubular preform 21 is heated and drawn in the longitudinal direction to form the POF 11. The POF 11 is then coated with a coating material in the coating process 28, and thereby a plastic optical fiber cable 29 is manufactured.

The manufacture process is hereinafter described in detail. The outer clad pipe 23 can be obtained by melt-extrusion of certain polymer in a tubular shape. It is also possible to obtain the outer clad pipe 23 by rotational polymerization to carry out polymerization of polymerizable compound having polymerizable monomer while a tubular chamber containing the polymerizable compound is rotated. In this embodiment, the outer clad pipe is formed from polyvinylidene fluoride (PVDF) as the raw polymer (outer clad formation polymer) by melt-extrusion. In the melt-extrusion process, a commercial-type kneading extruder can be used. The inner clad is formed on the inner wall of the outer clad pipe 23. The raw polymer for the inner clad is polymethylmethacrylate (PMMA). The inner clad may be formed by the same method (rotational polymerization) as the outer clad pipe. In the event of forming the outer clad by melt-extrusion, the inner clad may be formed by co-extrusion with the outer clad.

In forming the inner clad by the rotational polymerization method, one end of the outer clad pipe 23 is sealed with a plug of resin fluorine. Then, polymerizable compound (inner clad monomer) as the raw material of the inner clad is poured into the hollow part of the outer clad pipe. Although methylmethacrylate (MMA) is used as the inner clad monomer in this embodiment, other type of the monomer may be used as the inner clad monomer. Examples of the inner clad monomer will be explained later. After pouring the inner clad monomer, the hollow part of the outer clad pipe 23 is replaced with inactive gas like Argon gas, the other end of the outer clad pipe 23 is sealed with the plug of resin fluorine, and the outer clad pipe 23 is kept in a stainless protective pipe. The protective pipe containing the outer clad pipe 23 is rotated and heated to carry out polymerization of the inner clad monomer. During the polymerization process, the rotational speed and the heating temperature are controlled, if necessary. The rotational speed is preferably selected in accordance with the outer diameter of the outer clad pipe 23, and the rotational speed is preferably 300 rpm to 8000 rpm. The heating temperature is selected based on the type of the monomer, the kind and the amount of the polymerization initiator, and the kind and the amount of the chain transfer agent, and the heating temperature is preferably 35° C. to 140° C. It is preferable that the heating temperature increases step by step or gradually from the initiation stage to the ending stage in the polymerization process. When the polymerizable monomer takes the heating peak due to polymerization reaction, it is preferable to increase the heating temperature just before or just after the heating peak. Decompression and removal of non-reacted monomer just after polymerization process is also preferable. The decompression and removal of non-reacted monomer may be carried out at a room temperature or under a heated condition in accordance with the kind of the monomer to be polymerized.

Figure 4:
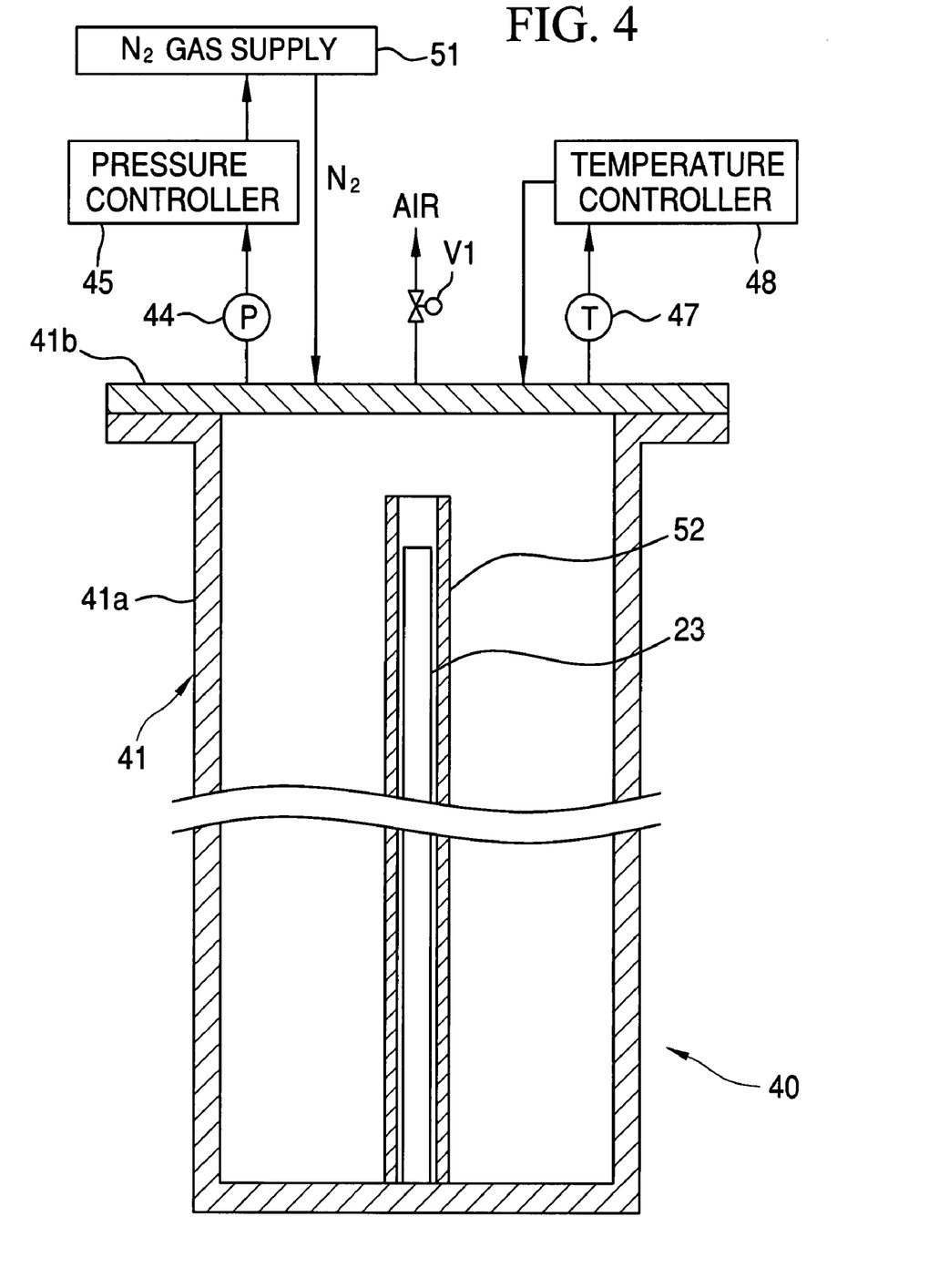
FIG. 4 is a schematic illustration of a polymerization apparatus for forming a core.

After forming the preform having the core in the hollow part of the inner clad, the POF is manufactured. In FIG. 4, polymerization equipment for forming the core is illustrated. The core is formed by interfacial gel polymerization method to obtain the POF having the refractive index profile shown in FIG. 2. In order to form the core part by use of the interfacial gel polymerization, the longitudinal axis of the polymerization chamber is kept vertical, as disclosed in Japan Patent No. 3332292, or the polymerization chamber is rotated during the polymerization process, as disclosed in JP-A No. 8-262240.

In this embodiment, the core monomer is polymerized while the longitudinal axis of the polymerization chamber is kept vertically. One end of the outer clad pipe 23 is sealed with the plug of resin fluorine. Then, polymerizable compound for the core (core monomer) is poured in the hollow part of the inner clad. Although MMA is used as the core monomer in this embodiment, it is possible to use other material as the core monomer. Examples of the core monomer are explained later.

The outer clad pipe 23 before pouring the core monomer is preferably under a decompressed condition for a certain period. Without the decompression process, the polymers for the outer clad and the inner clad polymer, and air and water contained in these polymers tend to be swelled by heat applied in polymerization of the core monomer. Thereby, it is possible to prevent distortion and crack in the outer clad and the inner clad, and to prevent fluctuation in the molecular density in the preform.

The core monomer (MMA) is poured in the hollow part of the inner clad together with the polymerization initiator, the chain transfer agent, the refractive index control agent (dopant), and so forth. The amount of the polymerization initiator, the chain transfer agent and the dopant will be explained later. Without the dopant, it is also possible to change the refractive index in the radial direction in the core by use of more than one kind of the core monomer. In this embodiment, the dopant that is not polymerized with the core monomer is used to change the refractive index in the core. The dopant is a compound with low molecular weight, high refractive index and large molecular volume.

Referring to FIG. 4, polymerization equipment 40 is used for polymerization of the core monomer. The polymerization equipment 40 comprises a polymerization chamber 41, a pressure gauge 44, a pressure controller 45, a thermometer 47 and a temperature controller 48. The polymerization chamber 41 is connected to a nitrogen gas supply 51 for supplying nitrogen gas as inactive gas. The polymerization chamber 41 comprises a chamber body 41a and a cover 41b that are fixed via a screw (not illustrated). Such structure of the polymerization chamber 41 does not limit the scope of the present invention, and other structure of the polymerization chamber is also applicable.

The pressure gauge 44 detects the internal pressure of the polymerization chamber 41. The pressure controller 45 adjusts the amount of nitrogen gas from the nitrogen gas supply 51 in accordance of the internal pressure detected by the pressure gauge 44, so the internal pressure of the polymerization chamber 41 is controlled. Due to the nitrogen gas supply 51, the internal air in the polymerization chamber 41 is replaced with nitrogen gas. Since the chamber body 41a and the cover 41b are tightly screwed, it is possible to adjust the internal pressure and the amount of nitrogen gas precisely. As for the gas to be supplied to the polymerization chamber 41, other inactive gas (such as argon) may be used. The thermometer 47 measures the temperature in the polymerization chamber 41. The temperature controller 48 controls the current to flow a heating line provided with the chamber body 41a in accordance with the temperature measured by the thermometer 47.

The outer clad pipe 23 containing the core monomer in the hollow part of the inner clad and other compounds such as the polymerization initiator, the chain transfer agent and the dopant is inserted in a glass pipe 52 as a jig, and the glass pipe 52 containing the outer clad pipe 23 is kept vertically in the polymerization chamber 41. The outer clad pipe 23 containing the core monomer is preferably subject to degauss process before or after insertion in the glass pipe 52. In order for the degauss process, the outer clad pipe 23 is preferably subject to be decompressed in a decompression chamber in terms of convenience and effect. In the decompression chamber, the outer clad pipe 23 is preferably subject to ultrasonic wave. The decompression process is preferably carried out for 30 minutes or longer.

After the cover 41b is screwed to the chamber body 41a containing the glass pipe 52 with the outer clad pipe 23, nitrogen gas is supplied to the polymerization chamber 41 from the nitrogen supply 51, and internal air in the polymerization chamber 41 is exhausted by opening a valve V1. Thereby, the internal air in the polymerization chamber is replaced with nitrogen gas. Thereafter, the pressure in the polymerization chamber 41 becomes a predetermined value by the pressure controller 45. The core monomer is heated for polymerization for predetermined time and temperature under the control of the temperature controller 48. The pressure during the polymerization process is preferably higher than the atmospheric pressure.

When the core monomer starts polymerization, the inner wall of the inner clad is swelled by the core monomer to generate a gelled swelled layer in an initial stage of polymerization. The swelled layer accelerates polymerization of the core monomer. This polymerization process starts from the side of the inner clad, and proceeds toward the center of the outer clad pipe 23 with respect to the axial direction. Since the compound with a small molecular volume tends to move toward the swelled layer, the dopant with a large molecular volume is moved toward the center of the outer clad pipe 23. Thereby, the density of the dopant with higher refractive index increases in the center of the outer clad pipe 23 as the polymerization process proceeds, so it is possible to obtain the preform 21 (see FIG. 3) having refractive index profile in which the refractive index increases from the inner clad side to the center of the preform 21. Since the preform 21 is formed by generating the swelled layer, the preform 21 does not have a clear border between the inner clad and the core. The clearness of the border changes in accordance with the kind and affinity of the inner clad monomer and the core monomer, the manufacture condition like generating the swelled layer, and so forth.

During polymerization of the core monomer in the polymerization chamber 41, the outer clad pipe 23 containing the core monomer is preferably supported by a jig like a glass pipe 52. The jig preferably has a hollow cylindrical shape having a hollow part enough to insert the outer clad pipe 23. The jig preferably has the shape to support the outer clad pipe 23 without fixing the outer clad pipe 23 therein, so the jig can prevent deformation of the hollow pipe during the pressurized polymerization, and can support the outer clad pipe 23 enough to relax the shrinkage of the core as the pressurized polymerization proceeds. If the outer clad pipe 23 is fixed in the jig, the core will have voids because the outer clad pipe 23 can not relax to the shrinkage of the core during polymerization. Thus, the diameter of the hollow part of the jig is preferably larger than the diameter of the outer clad pipe 23. Compared to the outer diameter of the outer clad pipe 23, the diameter of the hollow part is preferably larger by 0.1% to 40% of the outer diameter of the outer clad pipe 23, and more preferably larger by 10% to 20% of the outer diameter of the outer clad pipe 23. The jig may not be in the tubular shape if the outer clad pipe 23 can be vertically held in the jig and the jig can support the outer clad pipe 23 during the polymerization process.

The preferable pressure in the polymerization process is dependent on the kind of the core monomer. In too much pressurization, pressurized gas is dissolved in the core monomer, or the dissolved gas in the core monomer is not discharged. Thus, such dissolved gas becomes voids in the core during the drawing process 27. If the pressurization is too low, the core will have voids because the outer clad pipe 23 can not relax to the shrinkage of the core during polymerization. In this preferable embodiment, the pressure in polymerization is preferably 0.05 MPa to 1.0 MPa. Adjusting the pressure during the polymerization process can control the gaps and voids in the core of the preform (the core of the POF 11).

The polymerization process is preferably carried out under a heated condition. The temperature depends on the type of the core monomer, especially on the speed of polymerization and the temperature of degeneration. In the event of low molecular weight methacrylate compound as the core monomer, the temperature is preferably 50° C. to 150° C., more preferably 80° C. to 140° C. The period of polymerization is also depends on the type of the core monomer, and the preferable polymerization period is 4 hours to 48 hours. The conditions in polymerization are not limited to those described above. In addition, the method to polymerize the core monomer described above does not limit the present invention. For instance, as described in JP-A 8-262240, the hollow preform can be formed by polymerizing the monomer contained in a revolving hollow chamber, or the refractive index profile in the core can be provided by thermal diffusion of the refractive index control agent.

In this way, the cylindrical preform having the plastic core and the plastic clad is produced, and the preform is subject to the drawing process to manufacture the POF having a desired diameter, such as 500 μm to 1000 μm.

The material for the clad is not limited as long as the outer clad does not badly affect the optical transmission ability (for example, the refractive index of the clad is lower than that of the core). As the outer clad material, fluorine polymer is preferable because of low refractive index and small influence to the optical property of the POF. A preferable example of the fluorine polymer for the clad material is PVDF in consideration of polymerization of the core monomer.

The core material of the POF is not limited as long as the core does not badly affect the optical transmission property of the POF. An organic material with high optical transparency is preferable. The core material has higher refractive index than the clad for complete reflection of the signal light at the interface. In addition, the core material is preferably non-crystal polymer to reduce optical anisotropy. The core and the clad are preferably a polymer with excellent adhesiveness to each other, excellent mechanical property such as toughness, and excellent heat-resistance.

The core material is the polymer of the polymerizable monomer such as (meth)acrylic acid esters [(meth)acrylic ester without fluorine (a), (meta)acrylic ester containing fluorine (b)], styrene type compounds (c), vinyl esters (d), bisphenol A as the raw material of the polycarbonates. The core may be formed from homopolymer composed of one of these monomers, from copolymer composed of at least two kinds of these monomers, or from a mixture of the homopolymer(s) and/or the copolymer(s). Among them, (meth)acrylic acid ester and the polymer with fluorine are preferable as the optical transmission medium.

Concretely, examples of the (a) (meth)acrylic ester without fluorine as the polymerizable monomer are methyl methacrylate (MMA); ethyl methacrylate; isopropyl methacrylate; tert-butyl methacrylate; benzyl methacrylate (BzMA); phenyl methacrylate; cyclohexyl methacrylate, diphenylmethyl methacrylate; tricyclo [5·2·1·$0^{2.6}$]decanyl methacrylate; adamanthyl methacrylate; isobonyl methacrylate; methyl acrylate; ethyl acrylate; tert-butyl acrylate; phenyl acrylate, and the like.

Examples of (b) (meth)acrylic ester with fluorine are 2,2, 2-trifluoroethyl methacrylate; 2,2,3,3-tetrafluoro propyl methacrylate; 2,2,3,3,3-pentafluoro propyl methacrylate; 1-trifluoromethyl-2,2,2-trifluoromethyl methacrylate; 2,2,3, 3,4,4,5,5-octafluoropenthyl methacrylate; 2,2,3,3,4,4,-hexafluorobutyl methacrylate, and the like.

In (c) styrene type compounds, there are styrene; α-methylstyrene; chlorostyrene; bromostyrene and the like. In (d) vinylesters, there are vinylacetate; vinylbenzoate; vinylphenylacetate; vinylchloroacetate; and the like. The polymerzable monomers are not limited to the monomers listed above. Preferably, the kinds and composition of the monomers are selected such that the homopolymer or the copolymer in the core has a predetermined refractive index profile in the manufactured optical transmission medium.

When the POF is used for near infrared ray purpose, the C—H bond in the optical member causes absorption loss. By use of the polymer in which the hydrogen atom (H) in the C—H bond is substituted by the heavy hydrogen (D) or fluorine (F), the wavelength range to cause transmission loss shifts to a longer wavelength region. Japanese Patent No. 3332922 (counterpart of U.S. Pat. No. 5,541,247) and JP-A 2003-192708 teaches the examples of such polymers, such as deuteriated polymethylmethacrylate (PMMA-d8), polytrifluoroethylmethacrylate (P3FMA), polyhexafluoro isopropyl-2-fluoroacrylate (HFIP2-FA), and the like. Thereby, it is possible to reduce the loss of transmission light. It is to be noted that the impurities and foreign materials in the monomer that causes dispersion should be sufficiently removed before polymerization so as to keep the transparency of the POF after polymerization.

In polymerizing the monomer to form the core and the outer clad, a polymerization initiator can be added to initiate polymerization of the monomer. Examples of the polymerization initiators that generate radicals are peroxide compounds, such as benzoil peroxide (BPO); tert-butylperoxy-2-ethylhexanate (PBO); di-tert-butylperoxide (PBD); tert-butylperoxyisopropylcarbonate (PBI); n-butyl-4,4-bis(tert-butylperoxy)valarate (PHV), and the like. Other examples of the polymerization initiators are azo compounds, such as 2,2'-azobisisobutylonitrile; 2,2'-azobis(2-methylbutyylonitrile); 1,1'-azobis(cyclohexane-1-carbonitryl); 2,2'-azobis(2-methylpropane); 2,2'-azobis(2-methylbutane) 2,2'-azobis(2-methylpentane); 2,2'-azobis(2,3-dimethylbutane); 2,2'-azobis(2-methylhexane); 2,2'-azobis(2,4-dimethylpentane); 2,2'-azobis (2,3,3-trimethylbutane); 2,2'-azobis(2,4,4-trimethylpentane); 3,3'-azobis(3-methylpentane); 3,3'-azobis(3-methylhexane); 3,3'-azobis(3,4-dimethylpentane); 3,3'-azobis(3-ethylpentane); dimethyl-2,2'-azobis(2-methylpropionate); diethyl-2,2'-azobis(2-methylpropionate); di-tert-butyl-2,2'-azobis(2-methylpropionate), and the like. Note that the polymerization initiators are not limited to the above substances. More than one kind of the polymerization initiators may be combined.

In order to keep the physical properties, such as mechanical property and the thermal property, over the plastic optical fiber to be manufactured, it is preferable to control the polymerization degree by use of the chain transfer agent. The kind and the amount of the chain transfer agent are selected in accordance with the kinds of the polymerizable monomer. The chain transfer coefficient of the chain transfer agent to the respective monomer is described, for example, in "Polymer Handbook, $3^{rd}$ edition", (edited by J. BRANDRUP & E. H. IMMERGUT, issued from JOHN WILEY&SON). In addition, the chain transfer coefficient may be calculated through the experiments in the method described in "Experiment of Polymer Composition" (edited by Takayuki Ohtsu and Masayoshi Kinoshita, issued from Kagakudojin, 1972).

Preferable examples of the chain transfer agent are alkylmercaptans [for instance, n-butylmercaptan; n-pentylmercaptan; n-octylmercaptan; n-laurylmercaptan; tert-dodecylmercaptan, and the like], and thiophenols [for example, thiophenol; m-bromothiophenol; p-bromothiophenol; m-toluenethiol; p-toluenethiol, and the like]. It is especially preferable to use n-octylmercaptan, n-laurylmercaptan, and tert-dodecylmercaptan in the alkylmercaptans. Further, the hydrogen atom in C—H bond may be substituted by the fluorine atom (F) or a deuterium atom (D) in the chain transfer agent. Note that the chain transfer agents are not limited to the above substances. More than one kind of the chain transfer agents may be combined.

The plastic optical fiber may be a graded index (GI) type plastic optical fiber in which the core part has a refractive index profile in the radial direction, The GI type POF enables wide band optical transmission due to its high transmission capacity, so the GI type POF is preferably utilized for high performance communication. In order to provide a refractive index profile in the POF, an additive to provide refractive index profile (hereinafter referred to as "dopant") may be contained in the polymer matrix. Otherwise, plural polymers with different refractive indices or a copolymer of such polymers may be used as the polymer to form the core.

The dopant is a compound that has different refractive index from the polymerizable monomer to be combined. The difference in the refractive indices between the dopant and the polymerizable monomer is preferably 0.005 or higher. The dopant has the feature to increase the refractive index of the polymer, compared to one that does not include the dopant. In comparison of the polymers produced from the monomers as described in Japanese Patent No. 3332922 and Japanese Patent Laid-Open Publication No. 5-173026, the dopant has the feature that the difference in solution parameter is 7 (cal/cm$^3$)$^{1/2}$ or smaller, and the difference in the refractive index is 0.001 or higher. Any materials having such features may be used as the dopant if such material can stably exist with the polymers, and the material is stable under the polymerizing condition (such as temperature and pressure conditions) of the polymerizable monomers as described above.

Any materials having such features may be used as the dopant if such material can change the refractive index and stably exists with the polymers, and the material is stable under the polymerizing condition (such as temperature and pressure conditions) of the polymerizable monomers as described above. This embodiment shows the method to form the refractive index profile in the core by controlling the direction of polymerization by interface gel polymerizing method, and by providing gradation in density of the refractive index control agent during the process to form the core from the polymerizable compound mixed with the dopant. Other methods, such as diffusing the refractive index control agent after preform formation, are also possible to provide refractive index profile in the core. Hereinafter, the core having the refractive index profile will be referred to as "graded index core". Such graded index core is used for the graded index type plastic optical member having wide range of transmission band.

Examples of the dopants are benzyl benzoate (BEN); diphenyl sulfide (DPS); triphenyl phosphate (TPP); benzyl n-butyl phthalate (BBP); diphenyl phthalate (DPP); diphenyl (DP); diphenylmethane (DPM); tricresyl phosphate (TCP); diphenylsoufoxide (DPSO). Among them, BEN, DPS, TPP and DPSO are preferable. In the event that the dopant is polymerizable compound such as tribromo phenylmethacrylate, there may be advantageous in heat resistance although it would be difficult to control various properties (especially optical property) because of copolymerization of polymerizable monomer and polymerizable dopant. It is possible to control the refractive index of the POF by controlling the density and distribution of the refractive index control agent to be mixed with the core.

The amount of the polymerization initiator, the chain transfer agent and the refractive index control agent (dopant) can be determined in accordance of the kind of the core monomer. The amount of the polymerization initiator is preferably 0.005 wt % to 0.05 wt % of the core monomer, and more preferably 0.01 wt % to 0.02 wt %. The amount of the chain transfer agent is preferably 0.10 wt % to 0.40 wt % of the core monomer, and more preferably 0.15 wt % to 0.30 wt %. The amount of the dopant is preferably 1 wt % to 50 wt % of the core monomer.

Other additives may be contained in the core and the clad so far as the transmittance properties do not decrease. For example, the stabilizer may be used for increasing resistance of climate and durability. Further, induced emissive functional compounds may be added for amplifying the optical signal. When such compounds are added to the monomer, attenuated signal light is amplified by excitation light so that the transmission distance increases. Therefore, the optical member with such additive may be used as an optical fiber amplifier in an optical transmission link. These additives may be contained in the core and/or the clad by polymerizing the additives with the monomer.

Normally, at least one protective layer is coated with the POF, for the purpose of improving flexural and weather resistance, preventing decrease in property caused by moisture absorption, improving tensile strength, providing resistance to stamping, providing resistance to flame, protecting damage by chemical agents, noise prevention from external light, increasing the value by coloring, and the like.

As for the protective layer, any known material having excellent elasticity and mechanical property such as bending property may be used. Examples of the protective layer material are polyolefins, urethanes and elastomers.

The POF may have a second (or more) protective layer around the above described protective layer as the first protective layer. If the first protective layer has a thickness enough to decrease the thermal damage to the POF, the requirement of the hardening temperature of the second protective layer becomes less strict compared with the first protective layer. The second protective layer may be provided with the additives such as incombustibility, antioxidant, radical trapping agent and lubricant. The flame retardants are resin with halogen like bromine, an additive and a material with phosphorus. Metal hydroxide is preferably used as the flame retardant for the purpose of reducing toxic gas emission. Since the metal hydroxide contains crystal water and the water on the POF generated in the manufacture is hard to remove, the anti-flame coating is preferably formed on an anti-humidity coating that is formed on the first protective layer.

The POF may be coated with plural coating layers with multiple functions. Examples of such coating layer are a flame retardant layer described above, a barrier layer to prevent moisture absorption, moisture absorbent (moisture absorption tape or gel, for instance) between the coating layers or in the coating layer, a flexible material layer and a shock absorber to relax stress in bending the POF, a reinforced layer to increase rigidity. The thermoplastic resin as the coating layer may contain structural materials to increase the strength of the optical fiber cable. The structural materials are a tensile strength fiber with high elasticity and/or a metal wire with high rigidity. Examples of the tensile strength fibers are an aramid fiber, a polyester fiber, a polyamide fiber. Examples of the metal wires are a stainless wire, a zinc alloy wire, a copper wire. The structural materials are not limited to those listed above. It is also possible to provide other materials such as a metal pipe for protection, a support wire to hold the optical fiber cable. A mechanism to increase working efficiency in wiring the optical fiber cable is also applicable. Thereby, a plastic optical fiber code or a plastic optical fiber cable with multiple functions like mechanical property can be obtained.

The POF satisfying the above manufacture conditions or the plastic optical fiber code having the coating layer around the POF is fixed to an optical connector to connect the POF with an optical device, another POF, and so forth. Examples of the widely available optical connectors are PN type, SMA type, SMI type, F05 type, F07 type, MU type, FC type, SC type, and the like. Normally, the POF is fixed to the Ferrule, and the edge of the POF in the side fixed to the Ferrule is smoothed, and then the POF as the plug is connected to a housing of the optical connector. Although the glass optical fiber requires precise polishing due to its high melting point, the plastic optical fiber is softened at relatively low temperature, so the edge of the POF can be melted and smoothed by use of a flat heater (such as a hot plate) or a solvent. Thereby, the Ferrule is fixed to the edge of the POF by a receptacle, and output light from the fiber edge enters a light receiving element. In this way, the POF and the light receiving element are connected by use of the optical connector.

The optical transmission apparatus (optical transmission unit) comprises the light emission element, the light receiving element and the above described POF. The POF has a large diameter, and the output light beam keeps its diameter to a certain distance from the exit of the POF. Such optical transmission device can eliminate the necessity of precise alignment and light focusing element in connection of the POF with the light emission element or the light receiving element, so the optical connection can be established without a precise Ferrule and an adaptor having light focusing function. It is to be noted that the optical connection method stands for the method of optical connection between the POF and the light emission element, two POFs, and POF and the light receiving element. It is possible to establish the optical connection securely and flexibly by use of the above described conventional connector. In general, the plug with the Ferrule needs to be precisely fixed to the adaptor having the light receiving element. But the POF according to this embodiment has a large diameter as 1000 μm, so the plug is not necessarily fixed precisely to the adaptor. In the event of providing a light focusing element between the fiber edge and the light receiving element, the light focusing property changes based on the position of the fiber edge. But the optical transmission unit according to this embodiment does not require the light focusing element, so the transmission property is not badly affected by fluctuation in the position of the fiber edge. Thus, an easily attachable optical connector can be used in this embodiment. Between the fiber edge and the light receiving element, it is possible to provide an optical element of non-focusing function, such as a filter to control the light amount and the wavelength, an optical element (such as matching oil and silicone gel pad) having higher refractive index than air for the purpose of preventing Fresnel loss at the interface between the air and the POF or the light receiving element. It is also possible to provide a light focusing element in the adaptor for focusing the output light on the light receiving element.

The light emission element converts electric signals to optical signals that are transmitted through the POF, and the optical signals output from the POF is converted to electric signals in the light receiving element. The light emission element is a light emitting diode (LED) or a laser diode (LD), for example. The light receiving element is a photo diode (PD), for example. In order for high speed data transmission, the LD is preferable as the light emission element due to excellent coherency and linearity. The light emitting diode is mainly used for low-speed and short distance data transmission by use of the POF with large diameter because the emitted light beam of the LED has a large numerical aperture and the light beam is easily spread. The LED, however, has advantages in long life, high resistance to surrounding environment (such as high temperature), and a manufacture cost. In addition, it is considered to use a resonant cavity light emitting diode (RCLED) with a cavity for data transmission purpose. The RCLED generates spontaneous emission, so the RCLED is less advantageous in the spectrum width and the numerical aperture than the LD that generates stimulated emission. But compared with the LED, the RCLED is advantageous in the spectrum width, coherency, the numerical aperture and so forth. In other words, the emitted light beam from the RCLED is less diffused than the conventional LED, so the RCLED is appropriate for high speed data transmission. As for the PD as the light receiving element, a PIN photo diode and an avalanche photo diode (APD) are well known. Since the dark current increases as the light receiving area, the PD with a light receiving area makes the sensitivity worse and is not suitable for high data transmission. The APD is effective in order to deal with such problem. Alternatively, the photo diodes with small light receiving area may be arranged to form an LED array. These solutions, however, increases the cost of the optical transmission unit, so the LED array and the APD is mainly used for high speed data transmission purpose. The optical transmission unit in this embodiment reduces diffusion of the output light beam, so a large light receiving area in the PD is not necessary.

Figure 5:
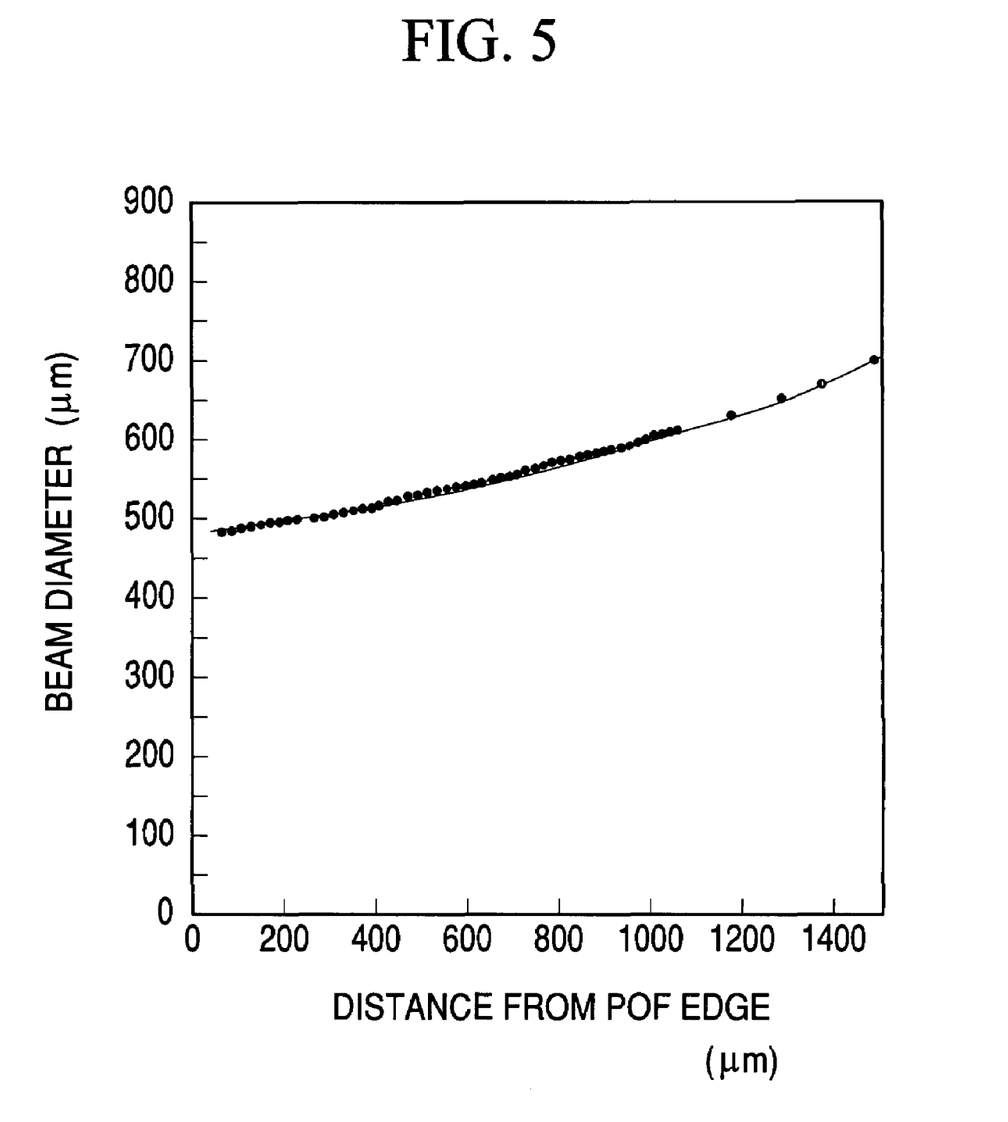
FIG. 5 is a graph of the beam diameter in relation to the distance from the output edge of the plastic optical fiber.

In the graph of FIG. 5, the diameter of the output light beam from the POF is shown in relation to the distance from the edge of the POF. The vertical axis in the graph indicates the diameter of the output light beam, and the horizontal axis indicates the distance from the edge of the POF. This graph shows that the optical transmission apparatus according to this embodiment can reduce spread of output light beam.

Next, the present invention will be described with reference to Experiments (1)-(6) as the embodiments of the present invention and the comparison embodiments. The materials, contents, operations and the like will be changed so far as these modifications are within the spirit of the present invention. Thus, the scope of the present invention is not limited to the Experiments described below.

Experiment 1

The plastic optical fibers with different core diameter d1 are manufactured. The outer diameter of the POF 11 is 750 μm.

The PVDF hollow outer clad 12 having the inner diameter of 19 mm and the length of 60 cm is formed by melt-extrusion, and the inner clad material is poured in the hollow part of the outer clad 12. The inner clad material is the mixture of MMA of 114 g as the radical polymerizable compound, 2,4-dimethylvaleronitrile (product name; V-65, manufactured by Wako Pure Chemical Industries, Ltd.) (half life period at 70° C. is 1 hour) as the polymerization initiator, and n-laurylmercaptan as the chain transfer agent. The moisture in MMA is reduced to 100 ppm or smaller by distillation. The mixture as the inner clad material is poured after adjusting the temperature thereof at a predetermined temperature. The moisture in 2,4-dimethylvaleronitrile is 200 ppm or smaller. The added amount of 2,4-dimethylvaleronitrile and n-laurylmercaptan to MMA are respectively 0.04 mol % and 0.20 mol %. The outer clad 12 containing the inner clad material is set in the chamber body 44a of rotational polymerization equipment 35 such that the longitudinal direction of the outer clad 12 is kept horizontally. The inner clad material is subject to thermal polymerization for 2 hours at 70° C. while the polymerization chamber 38 is rotated at 2000 rpm. A non-grounded thermocouple is provided at a position 1-2 cm from the polymerization chamber 38, and the measured temperature is considered as the polymerization temperature. The peak temperature during the polymerization is measured by use of the thermocouple. In Experiment 1, the measured peak temperature is 67° C. at the time of about 80 minutes after starting polymerization. After polymerization of the inner clad monomer, the inner clad 32 of PMMA is formed inside of the outer clad 12.

The core material is poured in the hollow part of the inner clad 32 at room temperature and atmospheric pressure. The inner clad material is the mixture of MMA of 67.5 g with the moisture of 100 ppm or smaller, 2,4-dimethylvaleronitrile (V-65) as the polymerization, initiator, n-laurylmercaptan as the chain transfer agent, and diphenylsulfide (DPS) as the non-polymerizable dopant. The added amount of 2,4-dimethylvaleronitrile, n-laurylmercaptan and DPS to MMA are respectively 0.04 mol %, 0.20 mol % and 7 wt. % (10 wt. % to DPS and MMA).

The outer clad 12 containing the core material is set again in the chamber body 44a of rotational polymerization equipment 35 such that the longitudinal direction of the outer clad 12 is kept horizontally. The inner clad material is subject to thermal polymerization for 2 hours at 70° C. while the polymerization chamber 38 is rotated at 2000 rpm. The measured peak temperature is 67° C. at the time of about 80 minutes after starting polymerization. The conversion rate of the core material after 2 hours of polymerization is 90%. Thereafter, the core monomer is heated for 24 hours at 120° C. while the polymerization chamber 38 is rotated at 500 rpm. The conversion rate of the core material is 99% or higher. Then, the polymerization chamber 38 is rotated for natural cooling of the outer clad 12 to obtain the preform 21. The preform 21 is subject to the drawing process to manufacture the POF 25.

The preform 21 has a hollow part in the center of the cross section in the core 33. The refractive index profile coefficient of the core 33 is 2.7. The POF obtained by decompressing the hollow part and drawing the preform has the outer clad diameter d3 of 750 μm.

The POF has a shape with no hollow part, and the inner clad diameter d2 is 712 μm. The outer diameter d3 of the outer clad is 750 μm. The inner clad diameter d2 is constant (712 μm), and the core diameter d1 is changed by changing the thickness of the inner clad and changing the amount of the polymerizable solution for core. The diameter d1 of the core of the obtained samples (A)-(F) are 80 μm (sample (A)), 130 μm (sample (B)), 200 μm (sample (C)), 340 μm (sample (D)), 470 μm (sample (E)), 650 μm (sample (F)) and 710 μm (sample (G)). The sample (F) is obtained by decreasing the thickness of the inner clad of the preform as thin as possible (0.7 mm or smaller). The refractive index n3 of the outer clad is 1.420, the refractive index n2 of the inner clad is 1.492, and the maximum refractive index of the core is 1.517.

The optical properties of the samples (A)-(G) of 25 m are measured by use of the light emission device of 650 nm. The light emission devices used in the experiments are LD (VCSEL), RCLED and LED. The light receiving element used in the experiments is PH (Product name; AQ2741, manufactured by Hamamatsu Photonics K.K.). The result of the measurement is listed in Table 1. In Table 1, "Parallel Area" indicates the length of the area in which the output light beam is parallel. "Beam Diameter" indicates the diameter of the output light beam at the position of 1000 μm from the edge of the POF. Other measurement items are the transmission loss and the bending loss. The transmission loss is measured by attenuation of output light at the position of 1000 μm from the edge of the POF compared with the amount of incident light to the POF. The transmission loss includes the coupling loss between the POF and the PD. The particulars of the measurement is described in JP-A 2004-093274.

The numerical aperture NA of the LD (VCSEL) as the light emission element is 0.05, the numerical aperture of RCLED is 0.27, and the numerical aperture of LED is 0.33. In Embodiment 1, the optical system is adjusted such that the spot diameter of the laser beam from the LD (VCSEL) is 200 μm and the numerical aperture NA of light emission device is 0.2.

TABLE 1

| Sample | Parallel Area (μm) | Beam Diameter (μm) | Transmission Loss (dB/km) | Bending Loss (dB) |
|---|---|---|---|---|
| (A) | 90 | 243 | 332 | 0.04 |
| (B) | 150 | 307 | 284 | 0.07 |
| (C) | 240 | 284 | 268 | 0.10 |
| (D) | 390 | 412 | 264 | 0.12 |
| (E) | 530 | 538 | 256 | 0.17 |
| (F) | 740 | 710 | 252 | 0.24 |
| (G) | 810 | 863 | 364 | 0.51 |

Experiment 2

In Experiment 2, the light emission device is RCLED (Product name; Panasonic RLED ENQD353D5, manufactured by Matsushita Electric Industrial Co., Ltd). The optical system is adjusted such that the spot diameter of the laser beam to enter the POF is 300 μm and the numerical aperture NA of light emission device is 0.1. The result of measurement is listed in Table 2. In this experiment, the bending loss is not measured.

TABLE 2

| Sample | Parallel Area (μm) | Beam Diameter (μm) | Transmission Loss (dB/km) |
|---|---|---|---|
| (A) | 80 | 253 | 336 |
| (B) | 140 | 311 | 292 |
| (C) | 210 | 379 | 280 |
| (D) | 380 | 422 | 272 |
| (E) | 530 | 547 | 264 |
| (F) | 730 | 724 | 260 |
| (G) | 800 | 871 | 372 |

Experiment 3

In Experiment 3, the light emission device is RCLED (Product name; Panasonic RLED ENQD353D5, manufactured by Matsushita Electric Industrial Co., Ltd). The optical system is adjusted such that the spot diameter of the laser beam to enter the POF is 650 μm and the numerical aperture NA of light emission device is 0.33. The result of measurement is listed in Table 3. In this experiment, the bending loss is not measured.

TABLE 3

| Sample | Parallel Area (μm) | Beam Diameter (μm) | Transmission Loss (dB/km) |
|---|---|---|---|
| (A) | 80 | 263 | 340 |
| (B) | 120 | 314 | 208 |
| (C) | 190 | 388 | 292 |
| (D) | 320 | 541 | 288 |
| (E) | 450 | 680 | 284 |
| (F) | 720 | 733 | 268 |
| (G) | 780 | 892 | 372 |

Experiment 4

In Experiment 4, the light emission device is LED (Product name; TOSLINK TODX2402, manufactured by Toshiba Corporation). The optical system is adjusted such that the spot diameter of the laser beam to enter the POF is 900 μm and the numerical aperture NA of light emission device is 0.33. The result of measurement is listed in Table 4.

TABLE 4

| Sample | Parallel Area (μm) | Beam Diameter (μm) | Transmission Loss (dB/km) | Bending Loss (dB) |
|---|---|---|---|---|
| (A) | 70 | 276 | 360 | 0.07 |
| (B) | 120 | 326 | 312 | 0.09 |
| (C) | 180 | 402 | 288 | 0.15 |
| (D) | 310 | 557 | 292 | 0.19 |
| (E) | 440 | 687 | 280 | 0.23 |
| (F) | 620 | 831 | 280 | 0.27 |
| (G) | 670 | 898 | 388 | 0.86 |

Experiment 5

In Experiment 5, the light emission device is LED (Product name; TOSLINK TODX2402, manufactured by Toshiba Corporation). The optical system is adjusted such that the spot diameter of the laser beam to enter the POF is 900 μm and the numerical aperture NA of light emission device is 0.4. The result of measurement is listed in Table 5. In this experiment, the bending loss is not measured.

TABLE 5

| Sample | Parallel Area (μm) | Beam Diameter (μm) | Transmission Loss (dB/km) |
|---|---|---|---|
| (A) | 60 | 347 | 360 |
| (B) | 110 | 403 | 352 |
| (C) | 160 | 491 | 340 |
| (D) | 280 | 652 | 332 |
| (E) | 390 | 813 | 336 |
| (F) | 550 | 880 | 396 |
| (G) | 600 | 912 | 388 |

Experiment 6

In Experiment 6, the step index type POF with no refractive index profile in the core by polymerization of the core monomer without forming the inner clad. The outer diameter d3 of the outer clad of the sample (H) is 750 μm and the core diameter (d1=d2) of 712 μm. The outer diameter d3 of the outer clad of the sample (I) is 750 μm, and the core diameter (d1=d2) thereof is 650 μm. The measurement and the results are the same as Experiment (1)-(5). The light emission device is the same as that used in Experiment (3).

TABLE 6

| Sample | Parallel Area (μm) | Beam Diameter (μm) | Transmission Loss (dB/km) |
|---|---|---|---|
| (H) | 0 | 1050 | 476 |
| (I) | 0 | 1020 | 460 |

When the numerical aperture NA of the incident light beam from the LED is 0.27, the parallel area, the beam diameter at the position of 1000 μm from the fiber edge, and the spreading angle of the output light is substantially the same as the results in the above described experiments using the RCLED. Instead of the sample (E), new samples (E2), (E3) are fabricated by adjusting the difference in the refractive index in the inner clad, and the same experiment is carried out by use of the samples (E2), (E3). The difference in the refractive index and the structural numerical aperture of the sample (E2) are 0.013 and 0.20, respectively. The difference in the refractive index and the structural numerical aperture of the sample (E3) are 0.023 and 0.26, respectively. The optical properties of the samples (E2), (E3) are substantially the same as that of the sample (E), except that the parallel area of the output beam becomes slightly longer as the difference in the refractive index increases. The transmission band of the samples (E), (E1), (E2) is 125 Mbps or higher (LED), 500 Mbps or higher (RCLED), and 1.25 Gbps or higher (LD).

In the event of light emission device of the numerical aperture NA of 0.35 or smaller, it is possible to reduce the spread of the output beam at the position of 1000 μm from the edge of the POF that has the core diameter d1 of 100 μm to 700 μm. Comparing the results of the samples (A)-(D) with the samples (E), (F), it is found that the optical loss tends to increase when the difference of the core diameter d1 and the inner clad diameter d2 increases.

INDUSTRIAL APPLICABILITY

The present invention relates to connection of a light emission device or a light receiving device with a transmission medium such as a plastic optical fiber.

The invention claimed is:

1. An optical connection method for connecting a light emission device and a light receiving device via a graded index plastic optical fiber, wherein a light beam from a light emission device enters one end of a graded index type plastic optical fiber, exits from the other end of the plastic optical fiber and enters the light receiving device, the method comprising:

providing the plastic optical fiber with a core, a first clad and a second clad, the core being in the shape of an approximately circular cross section and having the refractive index profile in which the refractive index increases toward the center, the first clad being formed outside of the core and having a refractive index equal to or smaller than the core, the second clad being formed outside of the first clad and having a refractive index smaller than the first clad, the plastic optical fiber satisfying the following conditions:

$100(\mu m) \leq d1 \leq 700(\mu m)$ $200(\mu m) \leq d2 \leq 1000(\mu m)$ $d1 < d2$ wherein d1 indicates the diameter of the core, and d2 indicates the outer diameter of the first clad.

2. The optical connection method according to claim 1, wherein the numerical aperture of the light emission device is 0.05 to 0.35.

3. The optical connection method according to claim 1, wherein the core and the first clad satisfy the condition of;

$$0.5 d2 \leq d1.$$

4. The optical connection method according to claim 1, wherein the core and the first clad satisfy the following conditions:

$$300(\mu m) \leq d1 \leq 700(\mu m)$$

$$350(\mu m) \leq d2 \leq 1000(\mu m).$$

5. The optical connection method according to claim 1, wherein the outer diameter of the first clad is equal to or larger than the diameter of the light beam to enter the plastic optical fiber.

6. The optical connection method according to claim 1, wherein the numerical aperture of the light emission device is smaller than the numerical aperture of the core.

7. The optical connection method according to claim 1, wherein the plastic optical fiber and the light receiving device are connected without a light focusing element, and the gap between the plastic optical fiber and the light receiving device is 1 μm to 1000 μm.

8. An optical transmission apparatus having a light emission device for emitting transmission light, a graded index type plastic optical fiber for passing the transmission light from one end to the other end thereof, and a light receiving device for receiving the transmission light output from the other end of the plastic optical fiber, the plastic optical fiber having a core, a first clad and a second clad, the core being in the shape of an approximately circular cross section and having the refractive index profile in which the refractive index increases toward the center, the first clad being formed outside of the core and having a refractive index equal to or smaller than the core, the second clad being formed outside of the first clad and having a refractive index smaller than the first clad, the plastic optical fiber satisfying the following conditions:

$$100(\mu m) \leq d1 \leq 700(\mu m)$$

$$200(\mu m) \leq d2 \leq 1000(\mu m)$$

$$d1 < d2$$

wherein d1 indicates the diameter of the core, and d2 indicate the outer diameter of the first clad.

9. The optical transmission apparatus according to claim 8, wherein the numerical aperture of the light emission device is 0.05 to 0.35.

10. The optical transmission apparatus according to claim 8, wherein the light emission device further comprises a light resonator.

11. The optical connection method according to claim 1, wherein a minimum value of the refractive index in the core is the same as the refractive index of the first clad.

12. The optical connection method according to claim 1, wherein the diameter of the core satisfies the following condition:

$$300(\mu m) \leq d1 \leq 700(\mu m).$$

13. The optical connection method according to claim 1, wherein the diameter of the core satisfies the following condition:

$$450(\mu m) \leq d1 \leq 500(\mu m).$$

14. The optical connection method according to claim 1, wherein the diameter of the first clad satisfies the following condition:

$$350(\mu m) \leq d2 \mu 1000(\mu m).$$

15. The optical connection method according to claim 1, wherein the diameter of the first clad satisfies the following condition:

$$700(\mu m) \leq d2 \leq 750(\mu m).$$

16. The optical connection method according to claim 1, wherein the core is a light passage and the outer clad and the inner clad cover the core.

17. The optical connection method according to claim 1, wherein the inner clad and the outer clad are formed by melt-intrusion and the core is formed by interfacial gel polymerization.

18. The optical connection method according to claim 1, wherein the light emission device comprises a light emitting diode as a light emission element, and the light receiving device comprises a photo diode as a light receiving element.

19. The optical transmission apparatus according to claim 8, wherein the light emission device comprises a light emitting diode as a light emission element, and the light receiving device comprises a photo diode as a light receiving element.

* * * * *